US009058185B2

(12) United States Patent
Mizuno

(10) Patent No.: US 9,058,185 B2
(45) Date of Patent: Jun. 16, 2015

(54) INFORMATION PROCESSING SYSTEM, DEVICE, MOBILE TERMINAL AND DEVICE DRIVER INSTALLATION METHOD

(71) Applicant: Kodai Mizuno, Aichi (JP)

(72) Inventor: Kodai Mizuno, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/034,939

(22) Filed: Sep. 24, 2013

(65) Prior Publication Data

US 2014/0089535 A1 Mar. 27, 2014

(30) Foreign Application Priority Data

Sep. 26, 2012 (JP) ................................. 2012-212845

(51) Int. Cl.
*G06F 9/44* (2006.01)
*H04N 1/00* (2006.01)
*G06F 9/445* (2006.01)

(52) U.S. Cl.
CPC .......... *G06F 9/4411* (2013.01); *H04N 1/00238* (2013.01); *H04N 1/00342* (2013.01); *H04N 1/00973* (2013.01); *H04N 2201/0081* (2013.01); *G06F 8/61* (2013.01)

(58) Field of Classification Search
CPC ... G06F 9/4411; G06F 3/0632; G06F 3/0689; G06F 13/385; H04L 129/06
USPC ......................................................... 710/10
See application file for complete search history.

(56) References Cited

U.S. PATENT DOCUMENTS

| 6,223,223 | B1 * | 4/2001 | Kumpf et al. .................. 709/227 |
| 7,366,186 | B1 * | 4/2008 | Rangarajan et al. .......... 370/401 |
| 2007/0011354 | A1 | 1/2007 | Ohara |
| 2007/0276763 | A1 * | 11/2007 | Kleinman et al. ............... 705/64 |

FOREIGN PATENT DOCUMENTS

JP 2007-19614 A 1/2007

* cited by examiner

*Primary Examiner* — Farley Abad
(74) *Attorney, Agent, or Firm* — Scully, Scott, Murphy & Presser, PC

(57) ABSTRACT

There is provided an information processing system including an information processing apparatus, at least one device, and a mobile terminal, the information processing apparatus being configured to perform a data communication with the at least one device in accordance with a first communication method, the mobile terminal being configured to perform the data communication with the information processing apparatus in accordance with the first communication method, and a data communication with the at least one device in accordance with a second communication method. If there exists device information, among a plurality of pieces of the device information the information processing apparatus obtained from the devices, coincides with the particular device information, the device corresponding to the piece of information that is identical to the particular device information is set as the device subjected to the installation.

16 Claims, 8 Drawing Sheets

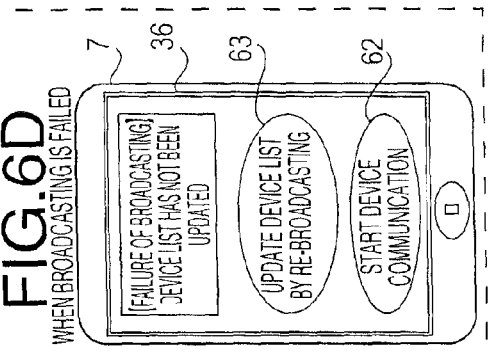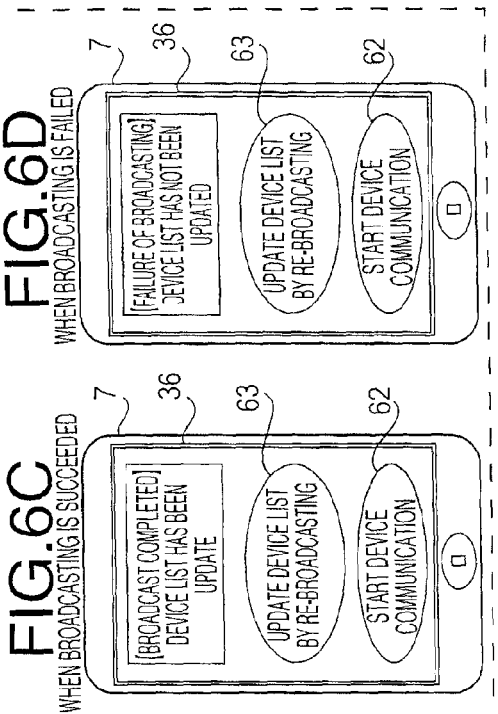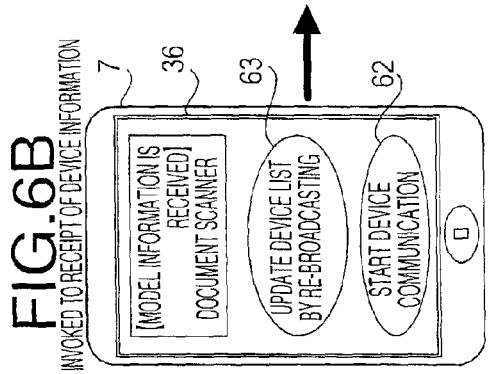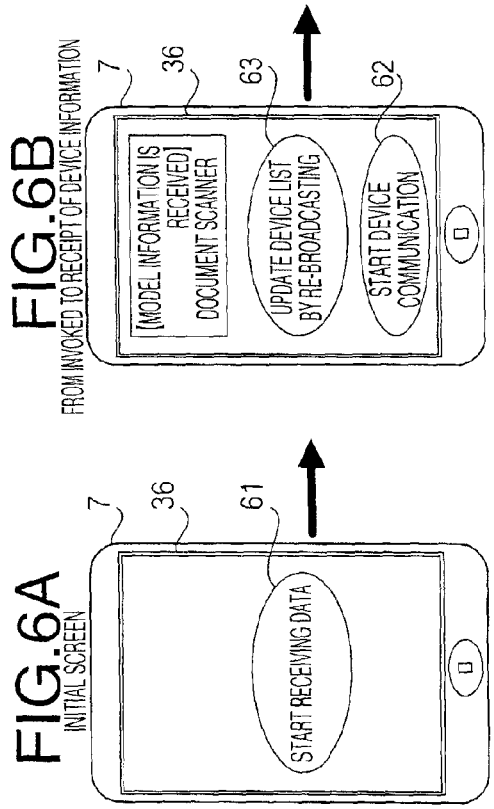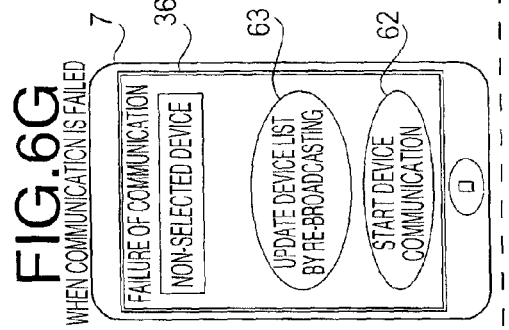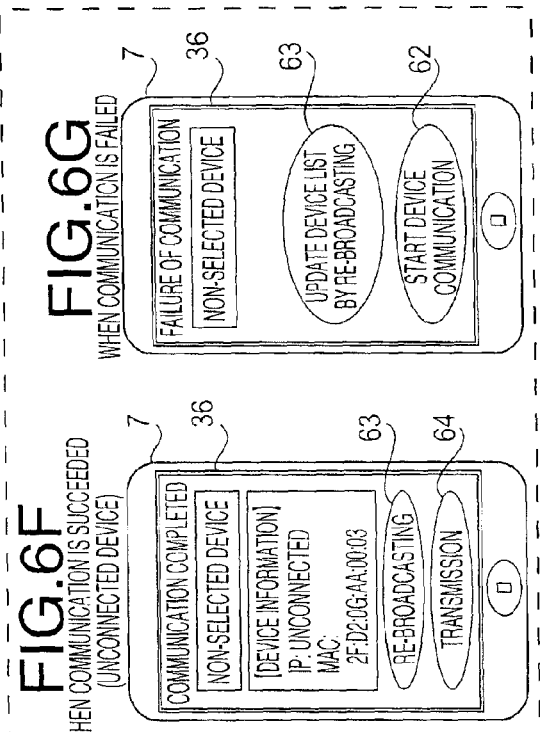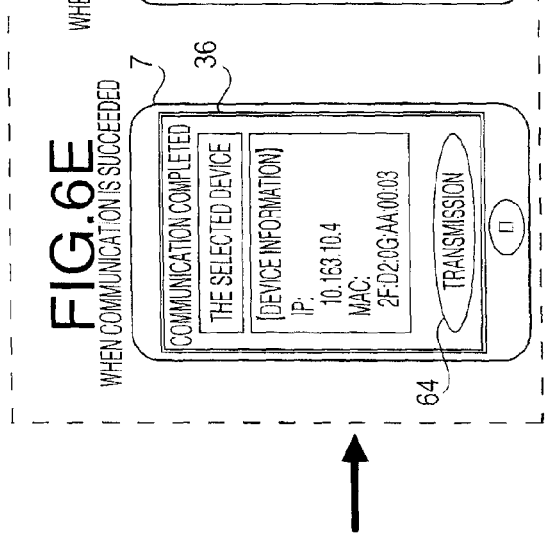

INFORMATION PROCESSING SYSTEM, DEVICE, MOBILE TERMINAL AND DEVICE DRIVER INSTALLATION METHOD

CROSS-REFERENCE TO RELATED APPLICATION

This application claims priority under 35 U.S.C. §119 from Japanese Patent Application No. 2012-212845 filed on Sep. 26, 2012. The entire subject matter of the application is incorporated herein by reference.

BACKGROUND

1. Technical Field

The following description relates to an information processing system, an information processing device and mobile terminal employed in the system, a device driver installation method form the information processing device and programs to be executed in the information processing device and the mobile terminal to install the device driver.

2. Prior Art

In an information processing device such as a personal computer (hereinafter, referred to as a PC), in order to use a peripheral device such as a scanner or a printer, a device driver corresponding to the device should be installed. When device driver is to be installed, typically, a data communication is performed between the PC and the peripheral device, and a installer of the device driver running in the PC obtains necessary information (e.g., IP address or MAC address of the peripheral device). The information the installer obtained from the peripheral device is typically displayed on a displaying device of the PC. After a user of the PC confirms that the displayed information is correct, and does a predetermined operation, installation of the device driver is executed.

SUMMARY

The installer executes a broadcast or multicast to a communication network to which the PC belongs when the installation of the device driver is executed to detect a device that can communicate with the PC, and obtains device information from the detected device. If there are a plurality of devices which can communicate with the PC, a plurality of pieces of the device information of the plurality of devices are displayed on the display device of the PC. When the user selects a desired one from among the plurality of devices as displayed, the device driver corresponding to the selected device is installed in the PC.

However, when a plurality of devices are listed on the display device as candidates for installation when the user intend to install the device driver, the user may have difficulty in identifying the device, of which the device driver is to be installed, in the list. In particular, if there are a plurality of devices of the same model within a communicatable area of the PC, it is significantly difficult to select a correct device.

In such a situation, if the desired device, of which the device driver is to be installed, has a display device such as an LCD (liquid crystal display), and by displaying the device information on the display device, the user can select, on the PC side, the desired device easily based on the displayed device information.

However, all the peripheral devices may not be provided with the display device such as the LCD. In particular, devices which are not provided with a display device in view of downsizing and/or cost reduction have been widely spread recently. In such a case, the user cannot know the device information of a device, which does not have a display, directly. Even though the device is provided with a display device, if the display device is of limited function (e.g., function to display only alphanumerical text, or function to display information by used of LED (light emitting diode)), it is difficult for the user to directly obtain the device information.

In consideration of the above problem, aspects of the invention enables the user of the information processing device such as the PC to easily select a device from among a plurality devices which do not have display device such as the LCD or have display devices of very limited function, so that the device driver for the desired device can be installed.

Considering the above-described problem, there is provided an information processing system including an information processing apparatus, at least one device, and a mobile terminal, the information processing apparatus being configured to perform a data communication with the at least one device in accordance with a first communication method, the mobile terminal being configured to perform the data communication with the information processing apparatus in accordance with the first communication method, and a data communication with the at least one device in accordance with a second communication method.

The information processing apparatus has a first obtaining unit for obtaining device information, in accordance with the first communication method, from each of the at least one device, the device information being necessary for installing a device driver for each of the at least one device, a second obtaining unit configured to obtain particular device information, in accordance with the first communication method, from the mobile terminal, the particular device information being information the mobile terminal have obtained from a particular device, a device information judging unit for judging whether there exists the device information, among the device information obtained by the first obtaining unit from the at least one device, which coincides with the particular device information obtained by the second obtaining unit, and an installation target setting unit for setting the device corresponding to the device information which coincides with the particular device information as a target device subjected to the installation in the information processing apparatus if the device information judging unit judges that there exists the device information which coincides with the particular device information.

The mobile terminal has a terminal side obtaining unit for obtaining the particular device information from the particular device in accordance with the second communication method, and a particular device information transmitting unit for transmitting the particular device information obtained by the terminal side obtaining unit to the information processing apparatus in accordance with the first communication method.

According to the information processing system configured as above, if there exists device information, among a plurality of pieces of the device information the information processing apparatus obtained from the devices, coincides with the particular device information, the device corresponding to the piece of information that is identical to the particular device information is set as the device subjected to the installation. With this configuration, even if the device subjected to the installation has no display devices such as the LCD, or a display having a relatively low displaying function, it is possible to select the desired device easily, and the device driver for the desired device can be installed.

It is noted that the various components provided to the information processing apparatus and/or mobile terminal according to the information processing system can be realized as programs running on computers.

BRIEF DESCRIPTION OF THE ACCOMPANYING DRAWINGS

FIGS. 6A-6G show examples of displayed screens of a mobile terminal.

DETAILED DESCRIPTION OF THE EMBODIMENT

Hereinafter, exemplary embodiments according to aspects of the invention will be described with reference to accompanying drawings.

Figure 1:
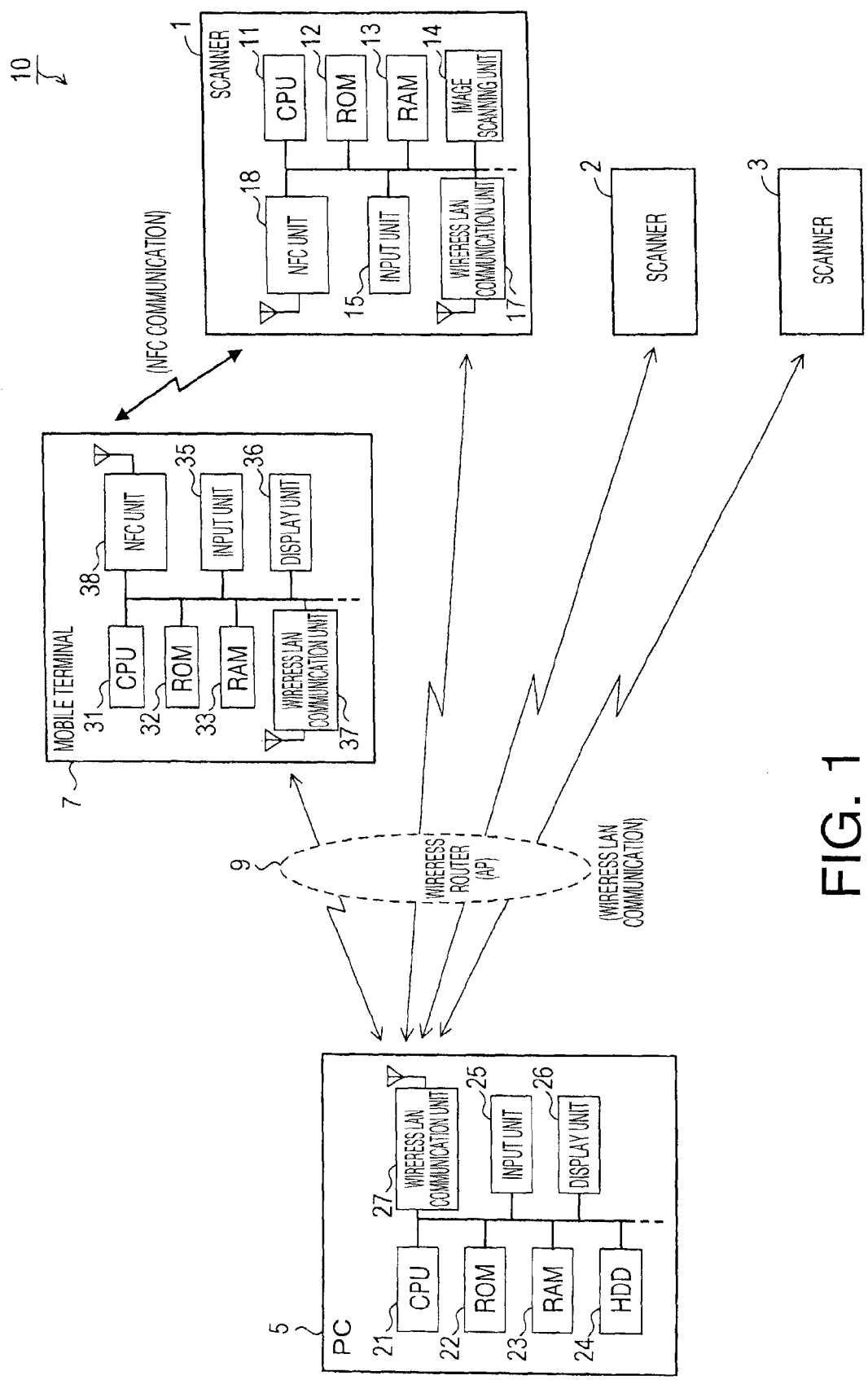
FIG. 1 is a block diagram illustrating a configuration of an information processing system according to an exemplary embodiment.

An information processing system 10 according to an exemplary embodiment includes, as shown in FIG. 1, three scanners 1, 2 and 3, and a mobile terminal 7. The PC 5 is capable of mutually communicating with each of the scanners 1, 2 and 4, and the mobile terminal 7, through a wireless LAN (local area network). In the following description, when the scanners 1, 2 and 3 need not be distinguished from each other for describing the embodiment, they may be simply referred to as "devices".

The data communication between the PC 5 and each of the scanners 1, 2 and 3 may be in an ad-hoc mode (i.e., directly performed between the PC 5 and each of the scanners 1, 2 and 3). According to the exemplary embodiment, the data communication is performed in an infrastructure mode (i.e., performed via a wireless router 9 which serves as an access point having a router function). So is the data communication between the PC 5 and the mobile terminal 7, and the data communication therebetween is performed via the wireless router 9.

Therefore, IP addresses are assigned to the PC 5, the scanners 1, 2 and 4, and the mobile terminal 7, which performs the wireless LAN communication via the wireless router 9. When a new device is to be used from the PC 5 through the LAN, the user may have the wireless router 9 recognize the new device, thereby it becomes possible that the device communicates, via the wireless router 9, with the PC 5 and the mobile terminal 7.

According to the exemplary embodiment, the mobile terminal 7 and the scanners 1, 2 and 3 can mutually perform data communication by a NFC (near field communication). The NFC is a well-known standard of a near field wireless communication for one-to-one bi-directional communication within a near range (e.g., within 10 cm). When the user position the mobile terminal 7 to face a predetermined portion of a predetermined device, the NFC is automatically established between the predetermined device and the mobile terminal 7, and a data communication is started.

According to the exemplary embodiment, the mobile terminal 7 obtains, from a device, device information thereof with the NFC. The device information is defined, in this specification, as information used to identify the device, and information indicating whether data communication through the wireless LAN can be performed between the device and the PC 5. As will be described later, the device information the mobile terminal 7 obtains from a particular device is transmitted to the PC 5 through the wireless LAN, and is used in the PC 5 to install a device driver for the particular device. That is, the device information is information necessary when the device driver is installed in the PC 5.

According to the exemplary embodiment, as least a MAC address and an IP address are set as the device information. When the user position the mobile terminal 7 to face the particular device, the MAC address and the IP address of the device are transmitted from the particular device to the mobile terminal 7.

When the user positions the mobile terminal 7 to face another device (e.g., a device other than the scanners 1, 2 and 3) which has not been recognized by the wireless router 9, the MAC address is transmitted to the mobile terminal 7 as the device information. However, the IP address is not transmitted to the mobile terminal 7 since it is not assigned to such a device. In this sense, the IP address as the device information is regarded as information representing whether the device has been recognized by the wireless router 9 as well as the information identifying the device. In other words, the IP address of the device is the information indicating whether the data communication between the device and the PC 5 through the wireless LAN can be performed (i.e., whether the device is Connected to a communication network to which the PC 5 is connected, and can perform a communication through the communication network), or the device is unconnected and the data communication with the PC 5 through the wireless LAN cannot be performed. It is noted that, as the device information, further information (e.g., a device name) may be included in addition to the MAC address and IP address. Further, if information necessary to install a device driver in the PC 5 and make the PC 5 used the device through the wireless LAN is included in the device information, the MAC address and/or the IP address may not be included in the device information.

Hereinafter, configurations of the scanners 1, 2 and 3, the PC 5 and the mobile terminal 7 will be described specifically. The scanners 1, 2 and 3 are of the same model and have the same configuration. Therefore, a configuration of one (i.e., the scanner 1) of the scanners 1, 2 and 3 will be described.

The scanner 1 has a CPU (central processing unit) 11, a ROM (read only memory) 12, a RAM (random access memory) 13, the image scanning unit 14, the input unit 15, the wireless LAN communication unit 17 and the NFC unit 18.

The CPU 11 controls various units in the scanner 1 and executes various operations in accordance with programs and data stored in the ROM 12. The ROM 12 stores a MAC address intrinsic to the scanner 1. The RAM 13 is typically used as a main memory directly accessed by the CPU 11. The RAM 13 stores the IP address which is assigned by the wireless router 9. The image scanning unit 14 includes an image sensor, scans an image on an original sheet and generates image data representing the scanned image.

The input unit 14 is for acquiring various inputs by the user to operate the scanner 1. According to the exemplary embodiment, the input unit 15 includes at least a small push button having an automatic returning mechanism. When the push button is depressed by the user, scanning of the original sheet is started, and generated image data representing the scanned image is transmitted to the PC 5.

The wireless LAN communication unit 17 is a well-known communication module, which is provided with antenna for the data communication through the wireless LAN. The NFC unit 18 is also a known communication module provided with antenna for the near field communication.

The scanner 1 according to the exemplary embodiment does not have information displaying device such as an LCD (liquid crystal display) which visually provide a user of information. Therefore, the user is unable to obtain various pieces of information such as an operating status and setting status of the scanner 1, and the device information from the scanner itself 1. Further, according to the exemplary embodiment, the scanner 1 is configured as a dedicated device for wireless LAN installation. That is, installation of a device driver for the scanner 1 should be done with performing the data communication between the PC 5 and the scanner 1. It is noted that, although the scanner 1 is configured that only the wireless LAN installation is available in the exemplary embodiment, it is not a requirement of the invention, and the device (e.g., the scanner 1) may be configured such that the installation using another means, in addition to the wireless LAN, can be done.

The PC 5 has a well-known configuration and has a CPU 21, a ROM 22, a RAM 23, a HDD (hard disk drive) 24, an input unit 24, a display unit 26 and a wireless LAN communication unit 27.

The input unit 25 includes well-known keyboard, mouse and touch panel to acquire user operations. The display unit 26 has a display device such as an LCD. The wireless LAN communication unit 27 is a well-known communication module provided with an antenna and used for data communication through the wireless LAN.

The HDD 24 stores various pieces of software (i.e., programs), which include device drivers for the scanners 1, 2 and 3, and installers function to install the drivers. In response to a user operation, an installer invokes, and when user selects a desired device of which the installer is to be installed, the device driver is installed in the PC 5, thereby the device can become usable from the PC 5.

Figure 5:
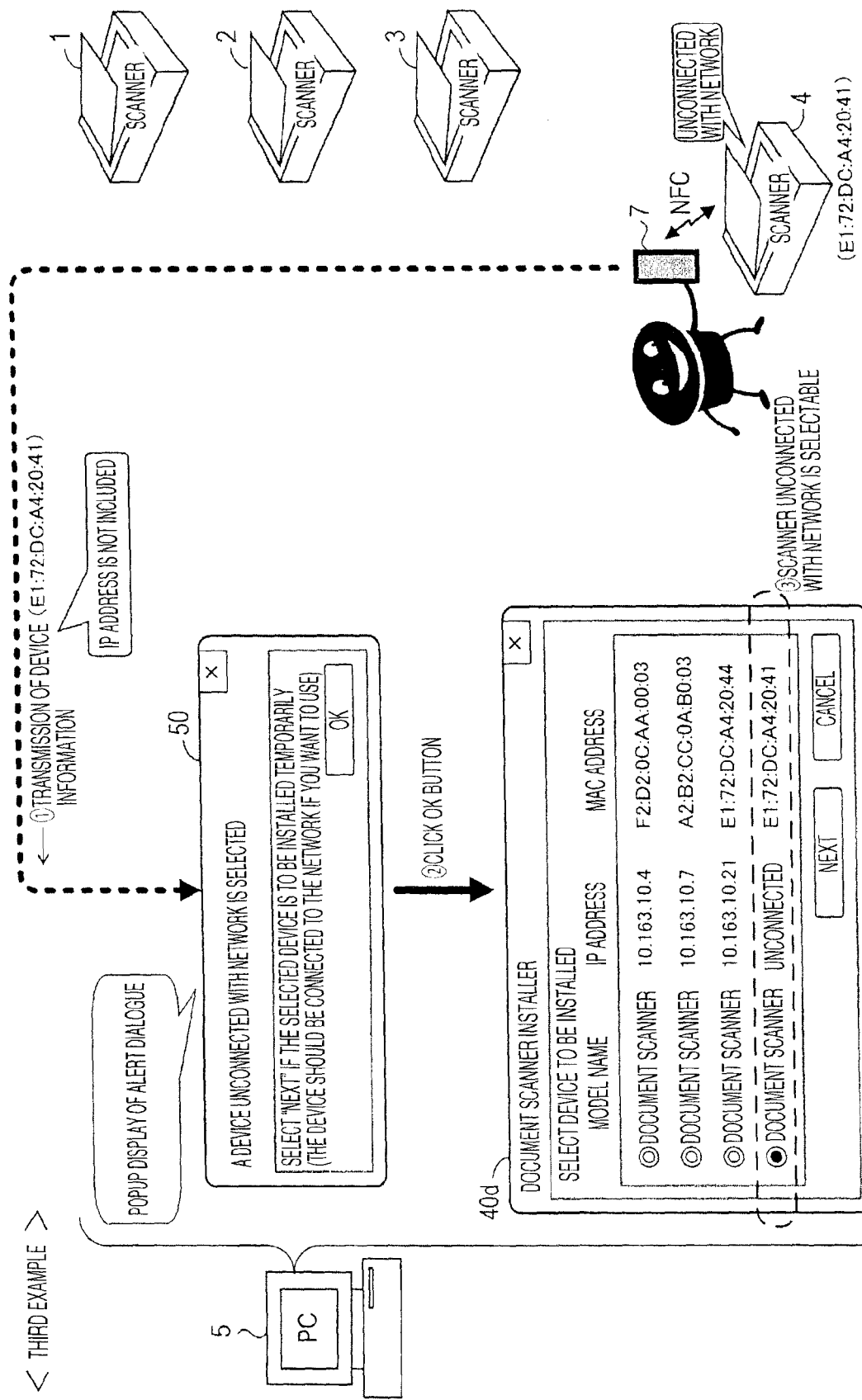
FIG. 5 shows a third example of installation of a device driver according to exemplary embodiment.

The mobile terminal 7 is a small mobile wireless communication terminal. The mobile terminal operates with a built-in battery, and the user can move with taking along the mobile terminal 7, and perform various operations and data communication. An appearance (plan view) is shown in FIG. 5. The mobile terminal 7 has, as shown in FIG. 1, a CPU 31, a ROM 32, a RAM 33, an input unit 35, a display unit 36, an wireless LAN communication unit 37 and an NFC unit 38.

The display unit 36 has an LCD and displays various pieces of information (see FIG. 5). The input unit 25 includes a touch panel which is arranged to cover an entire display area of the LCD of the display unit 36. The wireless LAN communication unit 37 is a known communication module for the data communication and has an antenna. The NFC unit 38 is also a known communication module to execute the near field communication, and is provided with an antenna.

The ROM 32 stores various pieces of software (i.e., programs) which includes a device installation application used to assist installation of the device driver in the PC 5. The device installation application has a function to obtain the device information from the particular device through the NFC and transmit the device information to the PC 5 through the wireless LAN.

Next, an installation process when the user installs the device driver for a desired device in the PC 5 will be described. When the installer is invoked in the PC 5 by the user, the installer executes a broadcast through the wireless LAN to search the device of the model for which the user intends to install a device driver, and collect device information from respective devices. Thus, the installer recognizes the devices which can communicate with the PC 5 (i.e., the devices of which the installers can be installed in the PC 5) immediately after invoked. Therefore, the devices recognized by the installer by the broadcast immediately after the installer was invoked are devices on the communication network (i.e., the wireless LAN in this exemplary embodiment) to which the PC 5 is connected (i.e., communicatably connected to the communication network) at the time of the broadcast, and communicatable with the PC 5.

Devices unconnected with the communication network to which the PC 5 is connected when the installer was invoked (i.e., devices which are not assigned with IP addresses and unable to communicate with the PC 5 through the wireless LAN) are not recognized by the installer. It is noted that, even if a device is in unconnected status when the installer was invoked, if the device becomes in connected status so that wireless LAN communication can be performed thereafter, such a device can communicate with the PC 5. Therefore, devices which were in unconnected status when the installer was invoked but become in connected status thereafter can be recognized by the installer by re-executing the broadcast.

Hereinafter, three typical case examples when the user have a device driver installed in the PC 5 will be described, referring to FIGS. 2-5.

A first case example: Installation of a device driver is executed when a desired device is recognized by the installer in response to the broadcast immediately after the installer is invoked.

A second case example: When the installer is invoked, the desired device is unconnected to the communication network and not recognized by the installer. Thereafter, the desired device is connected to the communication network, and have the installer execute the broadcast again to recognize the desired device, and execute installation of the device driver of the desired device.

A third case example: Installation is executed with the desired device being unconnected with the PC 5.

Figure 3:
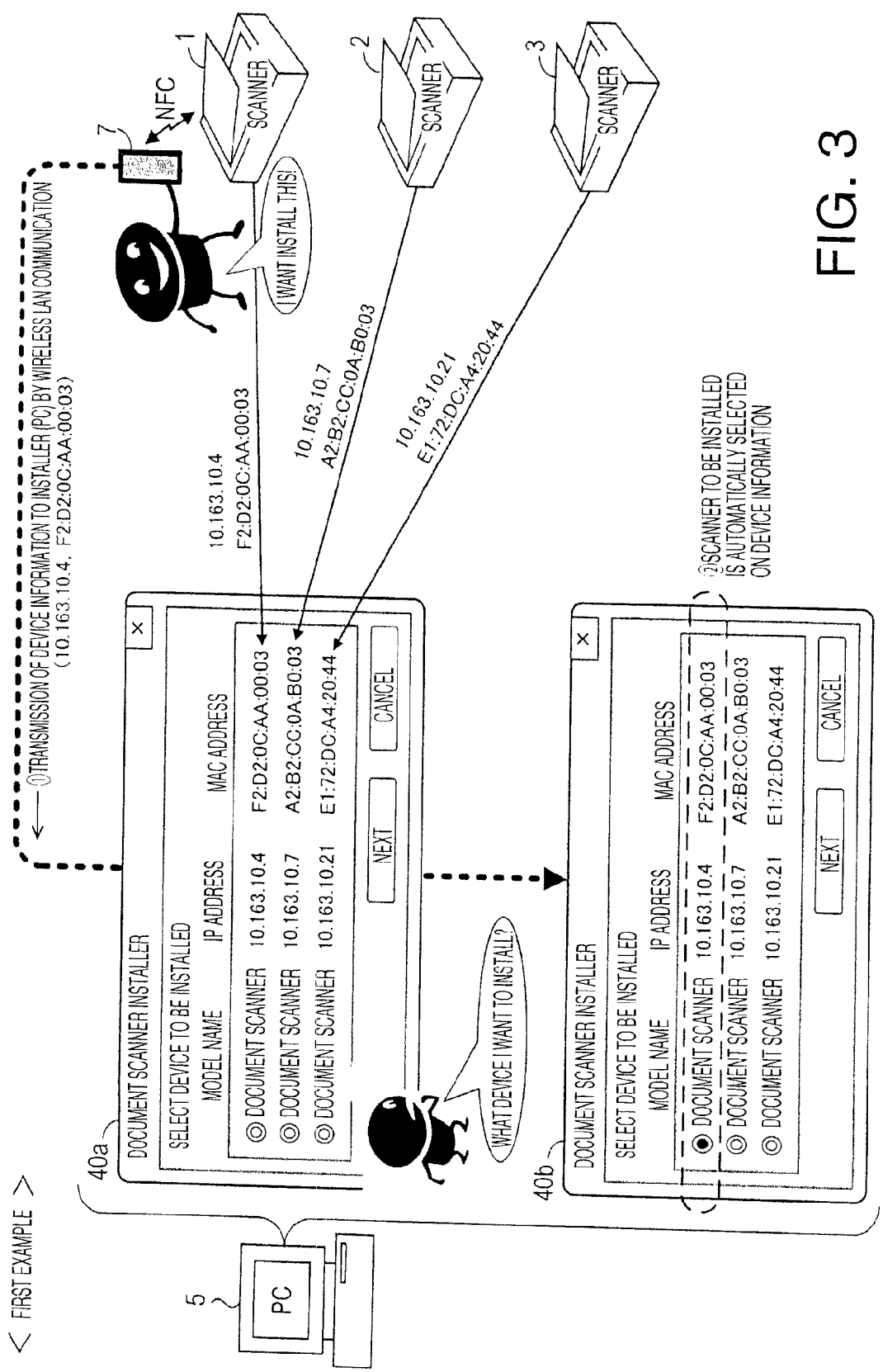
FIG. 3 shows a first example of installation of a device driver according to exemplary embodiment.

The first case example is described referring to FIG. 3. The installer of the PC 5 executes the broadcast designating the model name of the device of which the device driver is to be installed, and obtains the device information (e.g., MAC address, IP address, etc.) of the devices which are in the connected status with the PC 5. In the exemplary embodiment, the model name is a "document scanner." According to the case example shown in FIG. 3, in response to the broadcast, the device information is transmitted from the three scanners 1, 2 and 3, which are of the same model, to the PC 5 through the wireless LAN and recognized by the installer. The installer displays a device selection window 40a indicating device information of the recognized devices (i.e., candidates of the installation) in a list on the display unit 26 of the PC 5.

In the example shown in FIG. 3, three pieces of device information (i.e., IP address and MAC address) respectively obtained from the three devices of the designated model, which are in the connected status, are listed with the model name.

At this stage, the user may want to install a device driver for a certain device (e.g., the scanner 1). However, the user is unable to identifying the device from among the three devices displayed on the device selection window 40a. As described above, according to the exemplary embodiment, the scanner 1 has a simple configuration and does not have a information displaying device such as the LCD. Therefore, the user is unable to confirm the device information on the scanner side 1.

According to the exemplary embodiment, when the user position the mobile terminal 7 to face the desired device of which the device driver is to be installed, and executes a predetermined request operation, a predetermined data communication (i.e., the NFC) is performed between the mobile terminal 7 and the desired device, and the device information is transmitted from the desired device to the mobile terminal 7. Thereafter, as the user operates the mobile terminal 7 to execute a predetermined transmitting operation, the device information obtained by the NFC is transmitted to the installer (i.e., the PC 5) through the wireless LAN.

Figure 4:
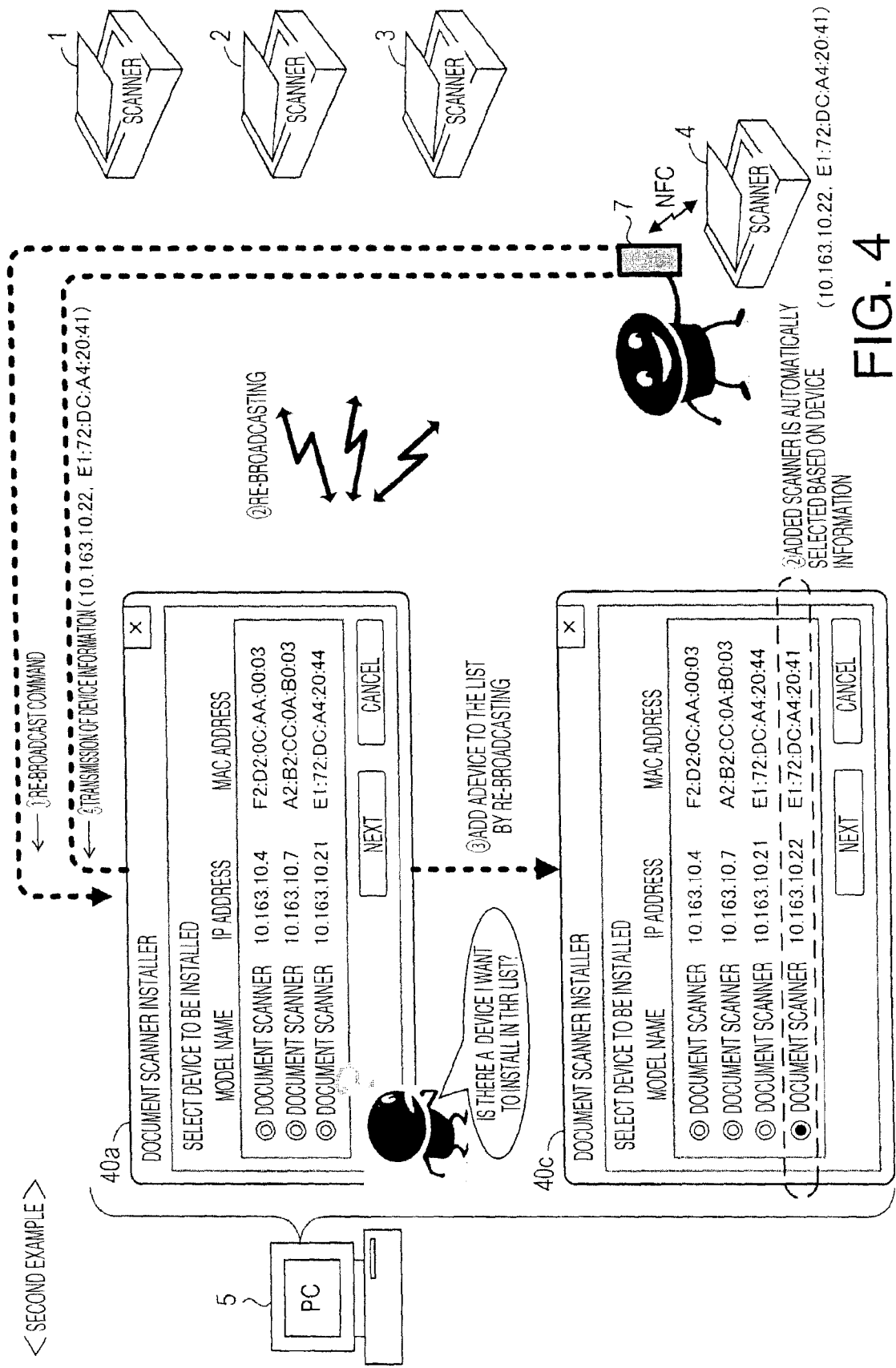
FIG. 4 shows a second example of installation of a device driver according to exemplary embodiment.

When the installer of the PC 5 receives the device information from the mobile terminal 7, the installer automatically selects a device corresponding to the received device information (i.e., the device having the same device information as the received device information) from among the three devices displayed on the device selection window 40a. FIG. 4 shows an example of the device selection window 40b in which a check box of the automatically selected device (i.e., the desired device) is automatically checked. If the user clicks the "next" button in this condition shown in FIG. 3, the installation of the device driver corresponding to the selected device is started.

FIG. 4 shows a second case example. In this second case example, when the installer is invoked, the three scanners 1, 2 and 3, which are in the connected status, are recognized, and then the device selection window 40a, in which the recognized three scanners 1, 2 and 3 are listed and displayed therein (i.e., similar to the first case example.

At this stage, if the user intends to install a device driver for a device other than the three scanners 1, 2 and 3 (in this case example, the other device is a scanner 4, which will also be referred to as an additional device) in the PC 5, it is necessary to have the additional device be communicatable with the PC 5 through the wireless LAN. Specifically, the user operates the wireless router 9 so that an IP address is assigned to the additional device and the like so that the additional device is communicatable with the PC 5 through the wireless LAN.

It is insufficient to have the additional device be in connected status in order to install the device driver in the PC 5, since the additional device is communicatable with the PC 5 through the wireless LAN but has not been recognized by the installer running in the PC 5.

According to the exemplary embodiment, therefore, the user operates the mobile terminal 7 to send a re-broadcast command to the PC 5. Then, the installer running in the PC 5 re-execute the broadcast to the model of the additional device. In response to the re-broadcast, the device information of the additional device can be obtained in addition to the device information of the three devices which have been in connected condition. After the above operation, the device information of the additional device is also listed in the device selection window 40c after the re-broadcasting. Thus, the it becomes possible for the user to select the additional device of which the device driver is installed in the PC 5.

After the additional device is added to the list on the device selection window 40c by the re-broadcasting, if the user performs the predetermined requesting operation by positioning the mobile terminal 7 to face the additional device, as in the first case example, the device information of the additional device is transmitted to the PC 5 via the mobile terminal 7, and the installer of the PC 5 automatically selects the additional device on the device selection window 40c as the device of which the device driver is installed. FIG. 4 shows a state where the additional device is automatically selected (i.e., the check box is checked) in the device selection window 40c.

Figure 2:
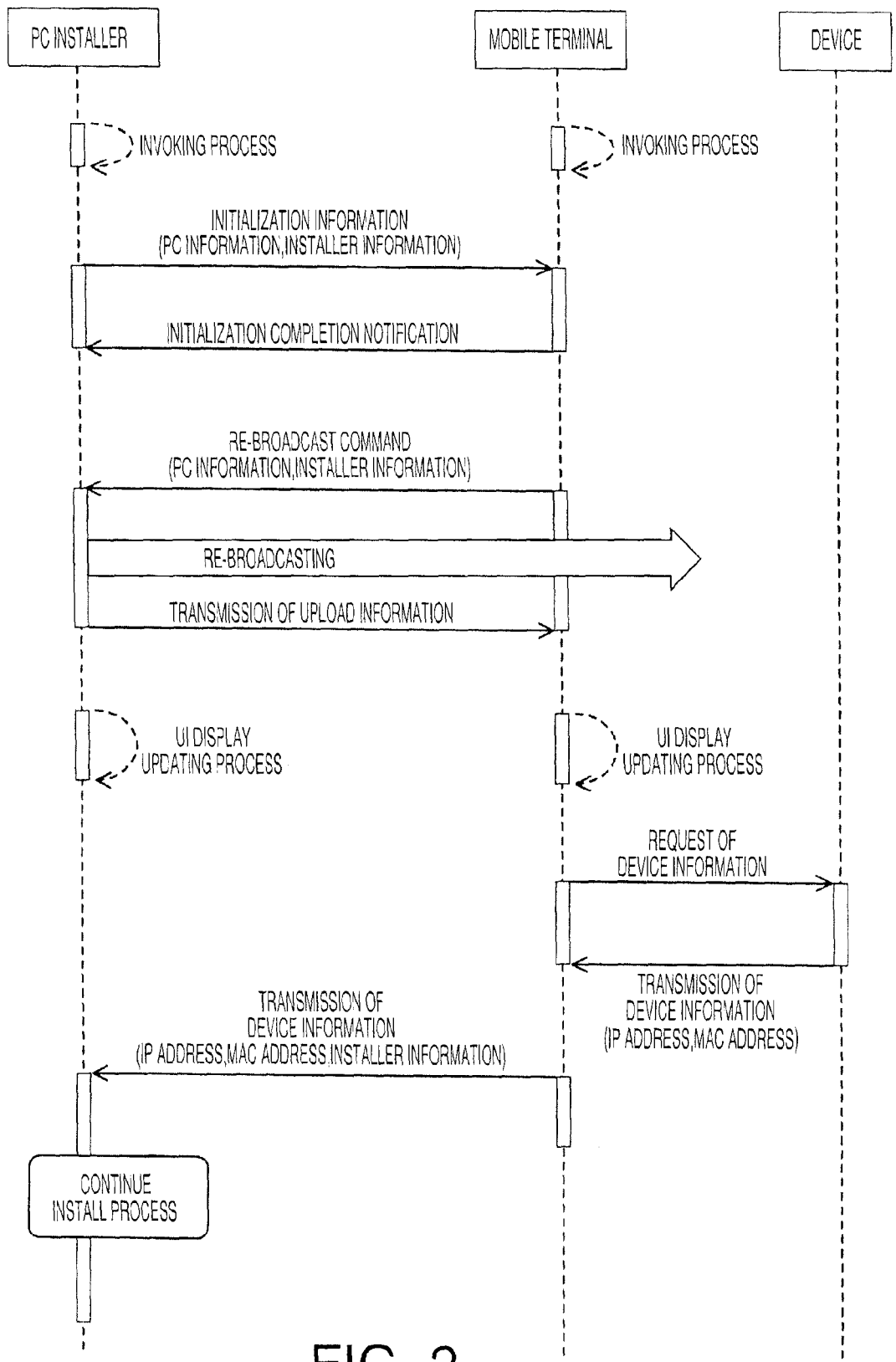
FIG. 2 shows a basic procedure of installing a device driver.

FIG. 2 schematically shows a basic procedure of installing the device driver, including the procedures in the first and second case examples. The installer of the PC 5 executes a predetermined startup process (e.g., acquisition of a model selection, broadcasting, etc.) after the install is invoked, and then displays the device selection window 40a. On the mobile terminal 7, when the user invokes the device installation application, a predetermined startup procedure is executed. The installer of the PC 5 transmits predetermined initialization information to the mobile terminal 7 through the wireless LAN after the startup process. The initialization information includes, for example, information identifying the PC 5 (e.g., the IP address of the PC 5), a model name of devices of which the device driver is to be installed. As the initialization information is transmitted from the PC 5 to the mobile terminal 7, the mobile terminal 7 recognizes the mode name of the device subjected to the installation or the PC (i.e., to communicate with) in which the installation is executed.

The mobile terminal 7 transmits initialization completion notification to the PC 5 in response to the initialization information transmitted from the PC 5 to inform the installer that the installation is ready. Thereafter, when the re-broadcast command is transmitted from the mobile terminal 7, the installer of the PC 5 executes re-broadcasting, and obtains device information from the devices (of the model subjected to installation) which are communicatable with the PC 5 through the wireless LAN at the time. The installer transmits update information representing whether the device drivers for the devices recognized by the installer have been updated to the mobile terminal 7.

The installer executes a UI (user interface) display updating process after it transmits the update information. Specifically, when the device drivers for the devices the installer recognizes are updated as the re-broadcast is performed, the list indicated in the device selection window 40a is updated based on the updated contents, and the device selection window 40 is displayed. At this stage, the device subjected to the installation has not been selected. In the mobile terminal 7, a UI display update process is executed based on the update information received from the PC 5. Specifically, as shown in FIG. 6C and FIG. 6D, information indicative of whether the list has been updated in response to the re-broadcasting is displayed on the display unit 36 of the mobile terminal 7.

The re-broadcast command transmitted from the mobile terminal 7 to the PC 5 includes the information on the PC 5 (e.g., the IP address) which is received as the initialization information, the installer information (e.g., the name of the model subjected to the installation) and the like.

After the re-broadcast, when user executes a predetermined request operation with positioning the mobile terminal 7 to face the desired device, the device information request is transmitted from the mobile terminal 7 to the device through the NFC. In response to the device information request, the device information (e.g., IP address of the device, MAC address of the device, etc.) is transmitted from the device to the mobile terminal 7. It is noted that whether the re-broadcast is to be done or not is determined by the user. Therefore, if the user has judged that the re-broadcast is unnecessary, the user may simply position the mobile terminal 7 to face the desired device to request the device information.

After the mobile terminal 7 receives the device information from the device through the NFC, when the user executes a predetermined operation, the device information is transmitted from the mobile terminal 7. The device information transmitted at this time is includes installer information in addition to the IP address and MAC address of the device. The installer of the PC 5 automatically selects the subjected device based on the device information, and proceeds the installation operation.

FIG. 2 shows a basic flow of installation of the device driver for the desired device through the mobile terminal 7. The basic flow is executed under a condition where the desired device of which the device driver is to be installed is unconnected with the PC 5. In contrast, according to the exemplary embodiment, even when a device is unconnected with the PC 5, a device driver for such device can be installed with remaining the unconnected condition of the device, in addition to the basic flow. Installation of the device driver with the device unconnected with a device is shown in FIG. 5, as the third case example.

According to the third case example, as shown in FIG. 5, the additional device of which the device driver is to be added is not recognized by the PC 5. Further, the data communication between such a device and the PC 5 through the wireless LAN is not available. In such a condition, when the user position the mobile terminal 7 to face the additional device, the device information is transmitted from the additional device to the mobile terminal 7. It is noted that the device information as received does not include the IP address since the additional device is unconnected and the IP address has not been assigned.

Even if the IP address has not been assigned to the additional device, the device information can be transmitted from the mobile terminal 7 to the PC 5 through the wireless LAN. The installer of the PC 5 causes an alert dialogue 50 to pop up on the display unit 26 when the device information which does not contain the IP address is received from the mobile terminal 7. The alert dialogue 50 is for notifying the user that, as shown in FIG. 5, an unconnected device has been selected by the user, installation of the device driver can be done tentatively with the unconnected status remained, necessity to make the device to a state where the wireless LAN communication can be done in order to us the device from the PC 5, and the like.

When the user clicks an OK button of the alert dialogue 50, it is assumed that the user intends to proceed to tentatively install the device driver of the unconnected device. Thus, the installer adds the device information of the unconnected device to the device selection window 40*a*, and automatically selects the unconnected device. FIG. 5 shows the device selection window 40*d* in which the unconnected device has been added to the list and automatically selected.

As above, when the unconnected device is automatically selected, the installer proceeds installation of the device driver for the unconnected device based on the currently available device information (containing MAC address but not IP address). Since the installation at this stage is a tentative one as the IP address of the device is not associated with the device driver, the tentative installation is executed using an tentative port name. Therefore, although the installation of the device driver is completed, the device cannot be actually used from the PC 5.

In order to have the device of which the device driver is tentatively installed operable from the PC 5, it is necessary to associate the IP address of the device with the device driver. As a method of associating the IP address to the device driver, for example, the use may input the IP address to the PC 5, make the installer perform the re-broadcast after the device is connected to the wireless LAN to transmit the IP address to the PC 5 by way o the mobile terminal 7, or the like.

It is noted that, when the alert dialogue box is popped up, the user may cause the mobile terminal 7 to transmit the re-broadcast command to the PC 5 so that the flow proceeds as in the second case example shown in FIG. 4.

Next, a process executed by the installer on the PC 5, and a process executed by the device installation application on the mobile terminal 7 will be described with reference to FIGS. 7 and 8.

Figure 7:
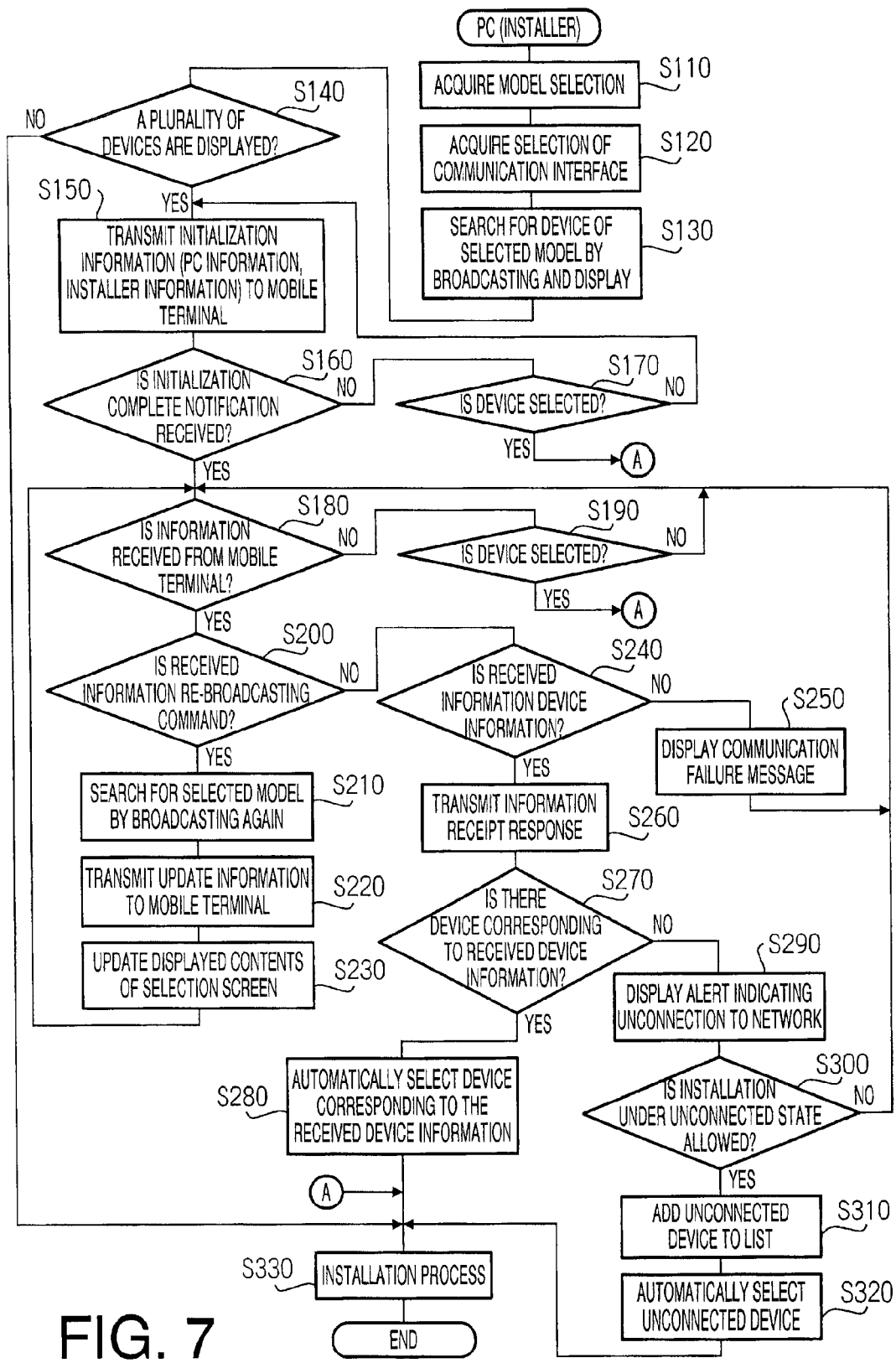
FIG. 7 is a flowchart illustrating a installation process executed in a personal computer, according to the exemplary embodiment of the invention.
Figure 8:
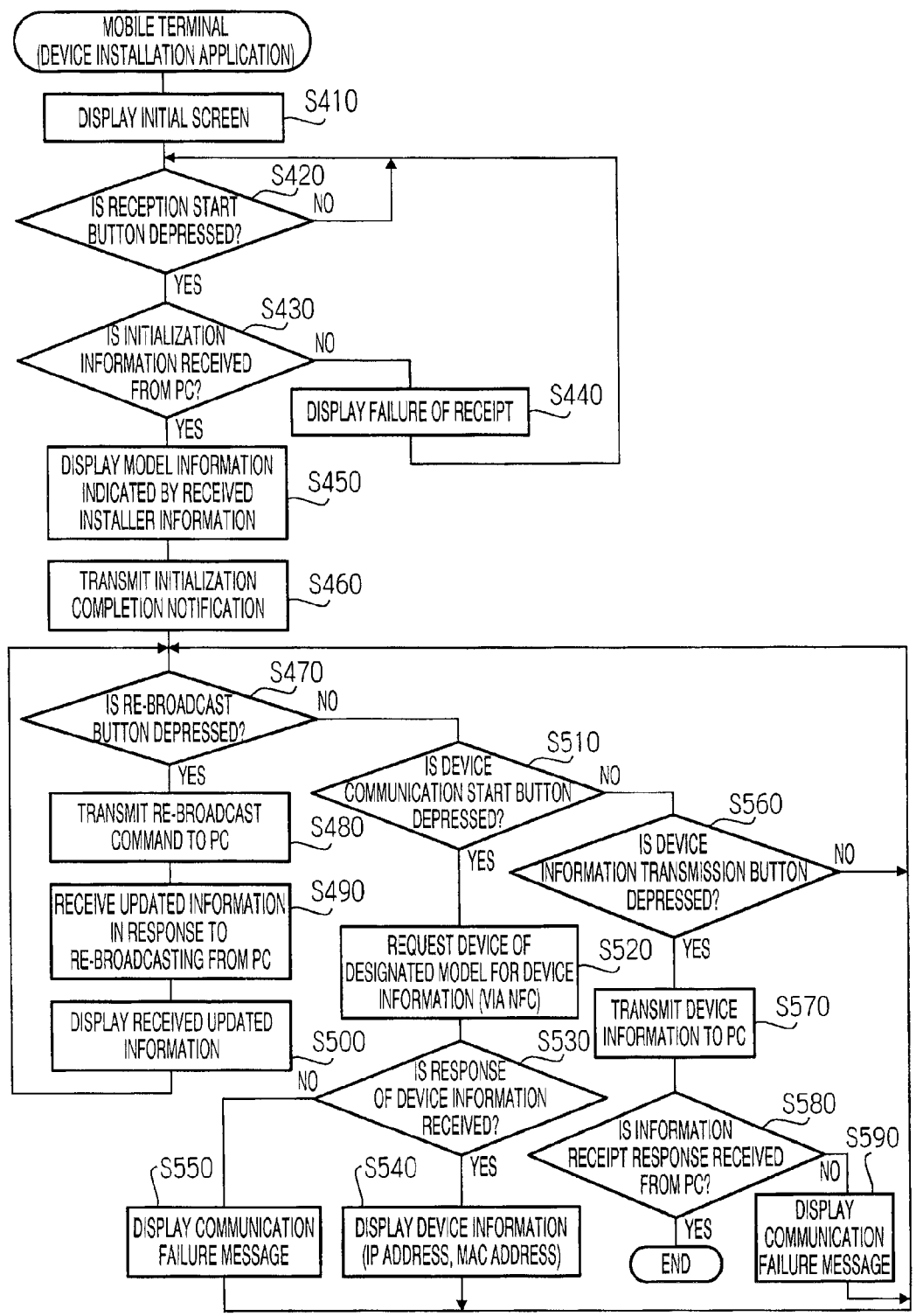
FIG. 8 is a flowchart illustrating a process executed by a device installation application running on the mobile terminal, according to the exemplary embodiment of the invention.

When the user executes a predetermined installer invoking operation on PC 5, and the CPU 11 invokes the installer program, the CPU 11 acquires the selection of the model (FIG. 7: S110). Specifically, the CPU 11 asks the user to select a model name of the device for which the device driver is to be installed. When the user has selected the model name for the device subjected to installation, the CPU 11 acquires selection of the communication interface (S120). Specifically, the CPU 11 asks the user to select whether the installation of the device driver is to be done through the wireless LAN, a wired LAN, or other interface (e.g., USB). When the user has selected the communication interface to be used, the CPU 11 proceeds to a procedure corresponding to the selected communication interface. In the exemplary embodiment, steps S130 onwards illustrate a case where the wireless LAN is selected as the communication interface to be used for the installation. Therefore, in the following description on FIG. 7, a case where the wireless LAN has been selected as the communication interface will be described.

In S130, the CPU 11 search for the devices of the model name which has been selected in S110, and displays the searched devices on the device selection window. With this search, in the first case example, the device selection window 40*a* as shown in FIG. 3 is displayed. In S140, the CPU 11 judges whether a plurality of devices are displayed on the device selection window, that is whether a plurality of devices of the designated model exist on the wireless LAN communication network.

If only one device is displayed on the device selection window, the device subject to the installation is the displayed device. In this case, the CPU 11 proceeds to S330 and start installation of the device driver for the device. If a plurality of devices are displayed in the device selection window, it is necessary to require the user to select one of the plurality of devices. In this case, the CPU 11 proceeds to S150. In S150, the CPU 11 transmits the initialization information (e.g., information regarding the PC, installer information, and the like) to the mobile terminal 7. After transmitting the initialization information, in S160, the CPU 11 judges whether the initialization completion notification is received from the mobile terminal 7. If the initialization completion notification is not received, the CPU 11 proceeds to S170. In S170, the CPU 11 judges whether a device subjected to the installation has been selected by the user. If none of the device is selected, the CPU 11 returns to S150. If one device has been selected, the CPU 11 proceeds to S330 and starts installation of the device driver for the selected device.

If the CPU 11 judges that the initialization completion notification has been received from the mobile terminal 7, the CPU 11 judges whether some information is received from the mobile terminal 7 (S180). If no information has been received from the mobile terminal 7, the CPU 11 judges whether the user has selected a device subjected to the installation in S190. If the user has not selected any device, the CPU 11 returns to S180. If the user has selected a device, the CPU 11 proceeds to S330 and starts installation of the device driver for the selected device.

If the CPU 11 has received some information, the CPU 11 judges whether the received information is the re-broadcast command (S200). If the received information is the re-broadcast command, the CPU 11 proceeds to S210 and executes re-broadcast regarding the model selected in S110 to search for the devices of the model. In S220, the CPU 11 transmits update information indicating the result of the re-broadcast, that is, whether the devices recognized by the installer are updated or not, is transmitted to the mobile terminal 7. Thereafter, in S230, the CPU 11 updates the displayed contents on the selection window (i.e., the device selection window) based on the result of the re-broadcast, and returns to S180. In the second case example, in S230, the device selection window 40c in which one device has been added is displayed.

If the received information is not the re-broadcast command (S200: NO), the CPU 11 proceeds to S240 and judges whether the received information is the device information. If the received information is not the device information (S240: NO), the CPU displays a communication failure message on the display unit 26 (S250) and returns to S180. If the received information is the device information (S240: YES), the CPU 11 transmits the information receipt response to the mobile terminal 7 (S260).

If there is not a device corresponding to the received device information (S270:NO), there is a possibility that the device corresponding to the received device information is currently unconnected (i.e., an unconnected device, which is an example of a unconnected particular device of the present invention). In such a case, the CPU 11 displays an alert indicating that the device is unconnected to the network (S290). That is, the alert dialogue 50 as shown in FIG. 5 is displayed on the display unit 26. Then, the CPU 11 judges whether the user has allowed the installation with the device being in unconnected state, that is, whether the "OK" button in the alert dialogue 50 has been depressed (S300). If the user has not allowed the installation (e.g., the user has clicked a "X" button) (S300: NO), the CPU 11 returns to S180. If the user has allowed the installation (S300: YES), the CPU 11 stores the device information (IP address being not included) of the unconnected device (S310), and add the device to the list displayed in the device selection window (S310).

Thus, in the third case example shown in FIG. 5, the device selection window 40d to which the unconnected device is added is displayed. After the unconnected device is added to the list, the CPU 11 automatically selects the unconnected device as the device subjected to the installation and proceeds to the installation procedure in S330. As aforementioned, the installation of the unconnected device is performed in accordance with a method of tentative installation based on the MAC address with the IP address unassigned. It is noted that, according to the exemplary embodiment, the installation procedure in S330 is executed when the user clicks the "NEXT" button displayed in the device selection window.

Next, the device installation application which runs in the mobile terminal 7 will be described with reference to FIG. 8. The CPU 31 of the mobile terminal 7 invokes a program of the device installation application when the user performs a predetermined startup operation to invoke the device installation application on the mobile terminal 7. The CPU 31 displays an initial screen shown in FIG. 6A when the device installation application is started (S410). Then, the CPU 31 waits for users depression (tap) of the reception start button 61 displayed in the initial screen S420. If the reception start button 61 is depressed (S420: YES), the CPU 31 proceeds to S430. When the reception start button 61 is depressed, the device installation application enters a procedure of receiving initialization information from the PC 5.

In S430, the CPU 31 judges whether the initialization information is received. If the initialization information has not been received (S430: NO), the CPU 31 displays failure of receipt of the initialization information (S440), and returns to S420. If the CPU 31 has received the initialization information (S430: YES), the CPU 31 displays model information contained in the installer information which is included in the received initialization information in S450. Specifically, in S450, the screen as shown in FIG. 6B is displayed. It is noted that the example shown in FIG. 6B shows that a document scanner is selected on the PC 5 as the model subjected to the installation. In this screen of the model information, a re-broadcast button 63 for requesting the re-broadcast, and a device communication start button 62 for obtaining the device information from the device are arranged.

After displaying the model information, the CPU 31 transmits the initialization completion notification to the PC 5 (S460), and proceeds to S470. In S470, the CPU 31 judges whether the re-broadcast button 63 has been depressed by the user. If the re-broadcast button 63 has been depressed by the user (S470: YES), the CPU 31 transmits the re-broadcast command to the PC 5 (S480). Then, the CPU 31 receives the updated information after the re-broadcast from the PC 5 (S490). Then, the CPU 31 displays the received update information (S500), and returns to S470. In S500, the CPU 31 displays a screen as shown in FIG. 6C, which shows information notifying that the list has been updated on the PC 5, when the broadcast is successful (i.e., the list has been updated as a result of the re-broadcast). If the broadcast was unsuccessful (i.e., the list has not been updated even if the re-broadcast was executed), the CPU 31 displays a screen as shown in FIG. 6D which shows information notifying that the list has not been updated on the PC 5.

If the re-broadcast button 63 has not been depressed (S470: NO), the CPU 31 proceeds to S510 and judges whether the device communication start button 62 has been depressed. If the device communication button has been depressed (S510: YES), the CPU 31 requests the model for the device information through the NFC. At this stage, if the user positions the mobile terminal 7 to face the desired device, the device information of the desired device is received by the NFC. Therefore, in S530, the CPU 31 judges whether a reply (i.e., the device information) has been receive in response to the device information request (S530). If the device information has been received as the reply (S530: YES), the CPU 31 displays the received device information on the display unit 36 (S540).

Specifically, if the device information includes the IP address, a screen indicating that the device to which the mobile device 7 is positioned to face is the device subjected to the selection (i.e., the device which can be selected on the PC side as a device subjected to the installation), and the device information (the IP address and the MAC address) received from the device is displayed as shown in FIG. 6E. In this case, on the display unit 36, a device information transmission button 64 for transmitting the device information to the PC 5 is also displayed.

In contrast, if the device information does not include the IP address, a screen indicating that the device to which the mobile terminal 7 is positioned to face is not the device subjected to the selection (i.e., the device which cannot be selected on the PC side as a device subjected to the installation at least for the time being), and the MAC address, which is the device information received from the device is displayed. Regarding the IP address, since it has not been obtained, an indication of "unconnected" is displayed. Further, on the display unit 36, the re-broadcast button 63 is displayed in addition to the device information transmission button 64. Therefore, by executing the re-broadcast after the device is connected to the wireless LAN, the device information including the IP address can be obtained.

If the device information has not been received (S530: NO), the CPU 31 displays a communication failure message on the display unit 36. Specifically, as shown in FIG. 6G, an indication of failure of the communication, and the device communication start button 62 and the re-broadcast button 63 are displayed.

If the device communication start button 62 has not been depressed (S510: NO), the CPU 31 proceeds to S560 and judges whether the user has depressed the device information transmission button 64. If the device information transmission button 64 has not been depressed (S560: NO), the PCU 31 returns to S470. If the device information transmission button 64 has been depressed (S560: YES), the CPU 31 transmits the device information to the PC 5 through the wireless LAN (S570). Then, the CPU 31 judges whether information receipt response is received from the PC 5 (S580). If the CPU 31 has not received the information receipt response from the PC 5 (S580: NO), the CPU 31 displays a transmission failure message (S590) and returns to S470. If the information receipt response has been received (S580: YES), the CPU 31 finishes the device installation application.

According to the information processing system 10 described above, when there are plural devices subjected to be the installation, if the user positions a mobile terminal 7 to face a desired device and depresses the device communication start button 62, the device information of the desired device is obtained through the NFC. When the user depresses the device information transmission button 63 of the mobile terminal 7, the device information obtained from the desired device is transmitted to the PC 5 through the wireless LAN. The installer of the PC 5 is capable of requesting for device information by broadcast, and obtains the device information from each of the devices subjected to the installation and displays the same. If the device information obtained from the devices includes a piece of information which coincides with the piece of device information obtained from the mobile terminal 7, the device corresponding to the piece of information is set as the device subjected to the installation. With this configuration, even if the device subjected to the installation has no display devices such as the LCD, or a display having a relatively low displaying function, it is possible to select the desired device on the PC 5 side easily, and the device driver for the desired device can be installed.

According to the exemplary embodiment, it is possible to request the PC 5 for the re-broadcast from the mobile terminal 7. Therefore, even if the desired device of which the device driver is to be installed has not been recognized by the PC 5, by the broadcast from the mobile terminal 7, it is possible to have the desired device recognized by the PC 5 easily, thereby the desired device can be set as the device subjected to the installation easily and without fail.

If the device from which the device information has been obtained is unconnected with the PC 5 (i.e., if the IP address has not be assigned), the mobile terminal 7 notifies the same (see FIG. 6F). Therefore, when the device information is obtained with the mobile terminal 7, the user can know quickly whether the device is connected to the wireless LAN, and whether the device has been recognized by the PC 5.

When the device information the mobile terminal 7 has obtained from a device does not include an IP address, and the user still wishes to execute installation of the device driver for the device even though the device is unconnected, it is possible to transmit the obtained device information with the state that the device information dose not include the IP address. When such device information, which does not include the IP address, is received, the installer running on the PC 5 makes the user select whether the installation of the device driver for the unconnected device is to be executed. If the user selects to proceed to execute the installation, the device driver is tentatively installed with the device being unconnected. As above, when the user wishes to install a device driver for the unconnected device, the device driver can be execute tentative installation of the device driver.

It should be noted that the invention needs not be limited to the configuration of the above-described exemplary embodiment, and can be modified in various ways without departing from the scope of the invention.

For example, in the exemplary embodiment, the re-broadcast of the PC 5 is executed in accordance with the re-broadcast command transmitted from the mobile terminal 7. However, this configuration could be modified such that the PC 5 may automatically execute the re-broadcast at a predetermined timing (e.g., at every predetermined interval).

In the exemplary embodiment, the communication among the PC 5, respective devices and the mobile terminal 7 is executed through the wireless LAN. This configuration is only an example, and other communication methods can be employed. Further, in the exemplary embodiment, the one-to-one communication between the mobile terminal 7 and a device is performed through the near field communication. This is only an example, and other communication methods could be employed. Still further, the communication among the PC 5, respective devices and the mobile terminal 7 needs not be limited to a wireless communication, and could be a wired communication.

In the exemplary embodiment, as a device for which a device driver is installed in the PC 5, a scanner is described. It is noted that the scanner is only an example of such a device, and the present invention can be applied to installation of device drivers for devices other than the scanner.

The present invention is particularly effective when the device has a display device having relatively low displaying function so that it is impossible or difficult to display various pieces of information (e.g., IP address, MAC address, etc.), when the device has a no display device.

The program of the installer running on the PC 5 may be provided such that the program is stored in the HDD of the PC 5 in advance, or may be provided by means of a computer-readable recording medium such as CD-ROM, DVD-ROM and the like. Alternatively, the program may be downloaded to the PC 5 via a network such as the Internet. So is the device installation application running on the mobile terminal 7.

What is claimed is:

1. An information processing system including an information processing apparatus, at least one device, and a mobile terminal, the information processing apparatus being configured to perform a data communication with the at least one device in accordance with a first communication method, the mobile terminal being configured to perform a data communication with the information processing apparatus in accordance with the first communication method, and a data communication with the at least one device in accordance with a second communication method, the information processing apparatus having a first processor configured to execute computer-executable instructions to provide:
a first obtaining unit configured to obtain device information, in accordance with the first communication method, from each of the at least one device, the device information being necessary for installing a device driver for each of the at least one device;

a second obtaining unit configured to obtain particular device information, in accordance with the first communication method, from the mobile terminal, the particular device information being information the mobile terminal have obtained from a particular device;

a device information judging unit configured to judge whether there exists the device information, among the device information obtained by the first obtaining unit from the at least one device, which coincides with the particular device information obtained by the second obtaining unit; and an installation target setting unit configured to set the device corresponding to the device information which coincides with the particular device information as a target device subjected to the installation in the information processing apparatus if the device information judging unit judges that there exists the device information which coincides with the particular device information, the mobile terminal having a second processor configured to execute computer-executable instructions to provide:

a terminal side obtaining unit configured to obtain the particular device information from the particular device in accordance with the second communication method; and a particular device information transmitting unit configured to transmit the particular device information obtained by the terminal side obtaining unit to the information processing apparatus in accordance with the first communication method.

2. The information processing system according to claim 1, wherein the second processor further provides:

an operation acquiring unit configured to acquire a predetermined requesting operation which causes the information processing apparatus to request the device for the device information; and a device information requesting unit configured to transmit a device information request which causes the information processing apparatus to request the device for the device information in accordance with the first communication method when the operation acquiring unit receives the predetermined requesting operation, wherein, in the information processing apparatus, when the first obtaining unit obtains the device information request from the mobile terminal, the first obtaining unit obtains the device information from each of the devices.

3. The information processing system according to claim 1, wherein the second processor further provides:

a communication status judging unit configured to judge whether the particular device is in a state where the data communication can be done with the information processing apparatus in accordance with the first communication method based on the particular device information which the terminal side obtaining unit obtains from the particular device; and a notifying unit configured to notify that the particular device is not in a communicatable state with the information processing apparatus when the communication status judging unit judges that the particular device is in the unconnected status.

4. The information processing system according to claim 3, wherein the second processor further provides a transmission selection acquiring unit configured to acquire selection operation to select whether the unconnected particular device information is transmitted to the information processing device, the unconnected particular information being the device information obtained from the particular device in the unconnected state when the communication status judging unit judges that the particular device is in the unconnected status; and wherein the particular device information transmitting unit transmits the unconnected particular device information to the information processing device when the transmission selection acquiring unit acquires a selection to transmit the unconnected device information.

5. The information processing system according to claim 4, wherein the first processor further provides:

an installation selection acquiring unit configured to acquire a selection whether installation of a device driver corresponding to the particular device is executed when the particular device information obtained by the second obtaining unit is the unconnected particular device information; and a tentative installation unit configured to install the device driver corresponding to the particular device in accordance with a predetermined tentative installation method without communicating with the particular device in accordance with the unconnected particular device information when the selection to execute installation.

6. The information processing system according to claim 1, wherein the first processor further provides an installation selection acquiring unit configured to acquire a selection whether installation of a device driver corresponding to the particular device is executed when the device information judging unit judges that device information coinciding with the particular device information does not exist; and wherein the installation target setting unit is configured to set the particular device corresponding to the particular device information as the installation target device when the installation selection acquiring unit acquires a selection to execute installation.

7. The information processing system according to claim 1, wherein the first processor further provides a display controlling unit configured to display the particular device information obtained by the second obtaining unit on the displaying device as well as the device information obtained by the first obtaining unit when the device information judging unit judges that device information coinciding with the particular device information does not exist.

8. The information processing system according to claim 1, wherein the device information includes a MAC address of the device.

9. The information processing system according to claim 1, wherein the second communication method has a shorter communicatable range than the first communication method.

10. An information processing apparatus communicatable with at least one device and a mobile terminal, comprising:

a processor; and a storage device storing instructions which cause the processor, when executed, to provide:

a first obtaining unit configured to obtain device information, in accordance with a first communication method, from each of the at least one device, the device information being necessary for installing a device driver for each of the at least one device;

a second obtaining unit configured to obtain particular device information, in accordance with the first communication method, from the mobile terminal, the particular device information being information the mobile terminal have obtained from a particular device;

a device information judging unit configured judge whether there exists the device information, among the device information obtained by the first obtaining unit from the at least one device, which coincides with the particular device information obtained by the second obtaining unit; and an installation target setting unit for setting the device corresponding to the device information which coincides with the particular device information as a target device subjected to the installation in the information processing apparatus if the device information judging unit judges that there exists the device information which coincides with the particular device information.

11. The information processing apparatus according to claim 10, wherein the instructions cause the processor to further provide an installation selection acquiring unit configured to acquire a selection whether installation of a device driver corresponding to the particular device is executed when the device information judging unit judges that device information coinciding with the particular device information does not exist; and wherein the installation target setting unit is configured to set the particular device corresponding to the particular device information as the installation target device when the installation selection acquiring unit acquires a selection to execute installation.

12. The information processing apparatus according to claim 10, wherein the instructions cause the processor to further provide a display controlling unit configured to display the particular device information obtained by the second obtaining unit on the displaying device as well as the device information obtained by the first obtaining unit when the device information judging unit judges that device information coinciding with the particular device information does not exist.

13. The information processing apparatus according to claim 10, wherein the device information includes a MAC address of the device.

14. An installation target setting method employed in an information processing system, which includes:

an information processing apparatus;
at least one device; and
a mobile terminal, wherein the information processing apparatus is configured to perform a data communication with the at least one device in accordance with a first communication method, the mobile terminal being configured to perform the data communication with the information processing apparatus in accordance with the first communication method, and a one-to-one data communication with the at least one device in accordance with a second communication method, the installation target setting method comprising:

a first obtaining step of obtaining device information, in accordance with the first communication method, from each of the at least one device in a state where the data communication with the information processing apparatus in accordance with the first communication method can be performed, the device information being necessary for installing a device driver for each of the at least one device;

a second obtaining step of obtaining particular device information, in accordance with the first communication method, from the mobile terminal, the particular device information being information the mobile terminal have obtained from a particular device;

a device information judging step of judging whether there exists the device information, among the device information obtained by the first obtaining step from the at least one device, which coincides with the particular device information obtained by the second obtaining step; and an installation target setting step of setting the device corresponding to the device information which coincides with the particular device information as a target device subjected to the installation in the information processing apparatus if the device information judging step judges that there exists the device information which coincides with the particular device information.

15. The installation target setting method according to claim 14, wherein the second communication method has a shorter communicatable range than the first communication method.

16. A non-transitory computer-readable medium storing computer-readable instructions that are executable by a processor, the instructions causing the processor, when executed, to provide:

a first obtaining unit configured to obtain device information, in accordance with a first communication method, from each of at least one device, the device information being necessary for installing a device driver for each of the at least one device;

a second obtaining unit configured to obtain particular device information, in accordance with the first communication method, from a mobile terminal, the particular device information being information the mobile terminal has obtained from a particular device;

a device information judging unit configured judge whether there exists the device information, among the device information obtained by the first obtaining unit from the at least one device, which coincides with the particular device information obtained by the second obtaining unit; and an installation target setting unit for setting the device corresponding to the device information which coincides with the particular device information as a target device subjected to installation in an information processing apparatus if the device information judging unit judges that there exists the device information which coincides with the particular device information.

* * * * *